: US 9,264,541 B2
: Feb. 16, 2016

(54) COMMUNICATION ESTABLISHING METHOD

(71) Applicants: Nen-Fu Huang, Hsinchu (TW); Wei-Kuan Shih, Hsinchu (TW); Yi-Ju Liao, Hsinchu (TW)

(72) Inventors: Nen-Fu Huang, Hsinchu (TW); Wei-Kuan Shih, Hsinchu (TW); Yi-Ju Liao, Hsinchu (TW)

( * ) Notice: Subject to any disclaimer, the term of this patent is extended or adjusted under 35 U.S.C. 154(b) by 0 days.

(21) Appl. No.: 14/723,024

(22) Filed: May 27, 2015

(65) Prior Publication Data

US 2015/0350426 A1 Dec. 3, 2015

(30) Foreign Application Priority Data

May 28, 2014 (TW) .............................. 103118699 A

(51) Int. Cl.
*H04M 3/42* (2006.01)
*H04M 3/44* (2006.01)

(52) U.S. Cl.
CPC ............ *H04M 3/44* (2013.01); *H04M 3/42093* (2013.01)

(58) Field of Classification Search
CPC ..................... H04L 29/06027; H04L 65/1083; H04L 47/781; H04M 3/42; H04M 7/123; H04M 15/08
USPC ...................................................... 455/414.1
See application file for complete search history.

(56) References Cited

U.S. PATENT DOCUMENTS

| | | | | |
|---|---|---|---|---|
| 7,894,587 | B1* | 2/2011 | Laurinavichus | H04Q 3/0029 379/142.01 |
| 2004/0152442 | A1* | 8/2004 | Taisto | H04M 15/24 455/406 |
| 2008/0194260 | A1* | 8/2008 | Altberg | G06Q 30/02 455/435.1 |
| 2010/0130172 | A1* | 5/2010 | Vendrow | G06Q 20/32 455/411 |

* cited by examiner

*Primary Examiner* — Don N Vo
(74) *Attorney, Agent, or Firm* — Muncy, Geissler, Olds & Lowe, P.C.

(57) ABSTRACT

The present disclosure illustrates a communication establishing method. The method includes following steps. A communication service program is executed on the mobile device to transmit an identification code to a cloud server. A toll-free number is determined and a communication number corresponding to the identification code is inquired from a lookup table. A control command is transmitted from the cloud server to the mobile device. The mobile device is controlled by the control command to dial a call request containing the toll-free number to a dial-up device. The dial-up device transmits a search request to the cloud server and the cloud server then return the communication number respected to the toll-free number to the dial-up device. Finally, the dial-up device automatic transfers the call request to the communication terminal, so as to establish a communication connection between the mobile device and a communication terminal.

10 Claims, 5 Drawing Sheets

COMMUNICATION ESTABLISHING METHOD

CROSS-REFERENCE TO RELATED APPLICATION

This application claims priority from Taiwan Patent Application No. 103118699, filed on May 28, 2014, in the Taiwan Intellectual Property Office, the contents of which are hereby incorporated by reference in their entirety for all purposes.

BACKGROUND OF THE INVENTION

1. Field of the Invention

The present disclosure relates to a communication establishing method, and more particularly, to a method of utilizing a communication service program to contact with the specific person by dialing free-payment telephone.

2. Description of the Related Art

A reverse charge call is to provide the user to contact professional person of the company by dialing the toll-free number. In most traditional approaches, the user dials the front receptionist of the company by a representative telephone number, and then dials to extension number according to voice instruction of the front receptionist; or automatically transfers to a related communication terminal by machine. The advantage of this approach is that the user can consult or complain with the company in free.

Another approach is that the professional person leaves the contact approach, for example the salesman leave his/her cell phone number, and the user must record the telephone and then contact with the professional person by dialing the recorded number. The advantage of this approach is that the user can contact with the professional person directly.

However, the drawback of the former approach is that multiple-layer transferring causes more time-consumption; the drawback of the later approach is that user cannot contact with the specific person by free-payment telephone. In addition, when the free-payment telephone of the company is changed, the user must search again, it is very inconvenient.

In other approach, the user can contact with the professional person of the company in free-payment contact via network telephone. However, the user must have the account of the professional person and only can contact with the professional person who is on line, and it is also inconvenient for the user.

SUMMARY OF THE INVENTION

An aspect of an embodiment of the present disclosure directs to a communication establishing method in which a toll-free call is automatically dialed to allow a user to directly contact with a specific person by a communication service program, so that the service convenience for user can be improved and the time cost can be saved.

In addition, an aspect of the embodiment of the present disclosure directs to a communication establishing method in which the user can operate the communication service program which corresponds to the specific person and is installed in the mobile device for communication via a cloud server, so that the user can directly communicate with the specific person in free-payment without remembering the toll-free number of the specific person.

Besides, an aspect of the embodiment of the present disclosure directs to a communication establishing method in which the user can feel like contacting a specific person via free-payment call, and meanwhile the mobile device also displays telephone number of the free-payment call but not network telephone, whereby the user's nice experience for the specific person can be improved efficiently.

An aspect of the embodiment of the present disclosure directs to a communication establishing method in which the user does not need to record the representative telephone number of the company or record the contact of different specific person. If the mobile device has the communication service program corresponding to the specific person, the user can communicate with the specific person in free-payment approach via a cloud server, whereby the convenience for the user can be improved.

An aspect of the embodiment of the present disclosure directs to a communication establishing system and method thereof, a communication service program incorporating with a GPS system of the mobile device of a professional person can provide at least one contact approach for the user to contact with the professional person.

An aspect of the embodiment of the present disclosure directs to a communication establishing system and method thereof, a communication service program can be used to decrease the rental cost of toll-free number cost and the personnel management cost for the company.

An exemplary embodiment of the present disclosure provides a communication establishing method. The communication establishing method includes following steps. A lookup table and a plurality of toll-free numbers are stored on a cloud server, a corresponding relationship between a plurality of identification codes and a plurality of communication numbers is recorded in the lookup table. A communication service program is executed on the mobile device to connect the cloud server, and an identification code of the communication service program is transmitted to the cloud server. A first toll-free number is determined from the plurality of the toll-free numbers and a communication number corresponding to the identification code is inquired from the lookup table. A control command containing the first toll-free number is transmitted to the mobile device. A call request containing the first toll-free number is dialed from the mobile device to a dial-up device by utilizing the control command. A query request having the first toll-free number is transmitted to the cloud server by the dial-up device. The communication number corresponding to the first toll-free number is returned to the dial-up device by the cloud server. The call request is transferred automatically to a communication terminal corresponding to the communication number, and a communication connection is established between the mobile device and a communication terminal.

Preferably, the communication establishing method of the present disclosure further includes following steps. A recognition unit is detected by the mobile device to obtain a network address, and then connect to the cloud server according to the network address for downloading the communication service program to the mobile device. A shortcut pattern is generated on a screen of the mobile device by the communication service program after the communication service program is installed in the mobile device. The communication service program is executed by clicking the shortcut pattern. The shortcut pattern displays a pattern corresponding to the communication terminal.

Preferably, the network address is obtained by using an image capture module of the mobile device to capture and analyze an image of the recognition unit, or by using a sensing unit of the mobile device to sense the recognition unit. The recognition unit includes characters, image, barcode, QR-code printed or bound on an object, or a NFC sensing IC or RFID IC disposed inside the object.

Preferably, the toll-free number is dynamically selected from the plurality of toll-free numbers stored in the cloud server.

Preferably, the control command includes a telephone dialing instruction, and the mobile device displays the first toll-free number while dialing.

Another exemplary embodiment of the present disclosure provides a communication establishing method. The communication establishing method includes following steps. A communication service program is executed on a mobile device to transmit an identification code of the mobile device to a cloud server. A toll-free number corresponding to the identification code is inquired by the cloud server and the toll-free number is stored in the cloud server. A control command containing the toll-free number is transmitted to the mobile device by the cloud server. A call request containing the toll-free number is dialed from the mobile device to a dial-up device by utilizing the control command. The call request is transferred automatically to the communication terminal by the dial-up device and a communication connection is established between the mobile device and the communication terminal.

Preferably, the communication establishing method of the present disclosure further includes following steps. A recognition unit is detected by the mobile device to obtain a network address, and then connect to the cloud server according to the network address for downloading the communication service program to the mobile device. A shortcut pattern is generated on a screen of the mobile device by the communication service program after the communication service program is installed in the mobile device. The communication service program is executed by clicking the shortcut pattern. The shortcut pattern displays a pattern corresponding to the communication terminal.

Preferably, the network address is obtained by using an image capture module of the mobile device to capture and analyze an image of the recognition unit, or by using a sensing unit of mobile device to sense the recognition unit.

Preferably, the recognition unit includes characters, image, barcode, or QR-code printed or bound on an object, or a NFC sensing IC or RFID IC disposed inside the object.

Preferably, the control command includes a telephone dialing instruction, and the mobile device displays the toll-free number while dialing.

BRIEF DESCRIPTION OF THE DRAWINGS

The above and other features and advantages of the present disclosure will become more apparently in detail exemplary embodiments thereof with reference to the attached drawings in which.

DETAILED DESCRIPTION OF THE PREFERRED EMBODIMENTS

Hereinafter, embodiments of the present disclosure will be described in detail below with reference to accompanying drawings. As used herein, the term "and/or" includes any and all combinations of one or more of the associated listed items. Expressions such as "at least one of," when preceding a list of elements, modify the entire list of elements and do not modify the individual elements of the list.

Figure 1:
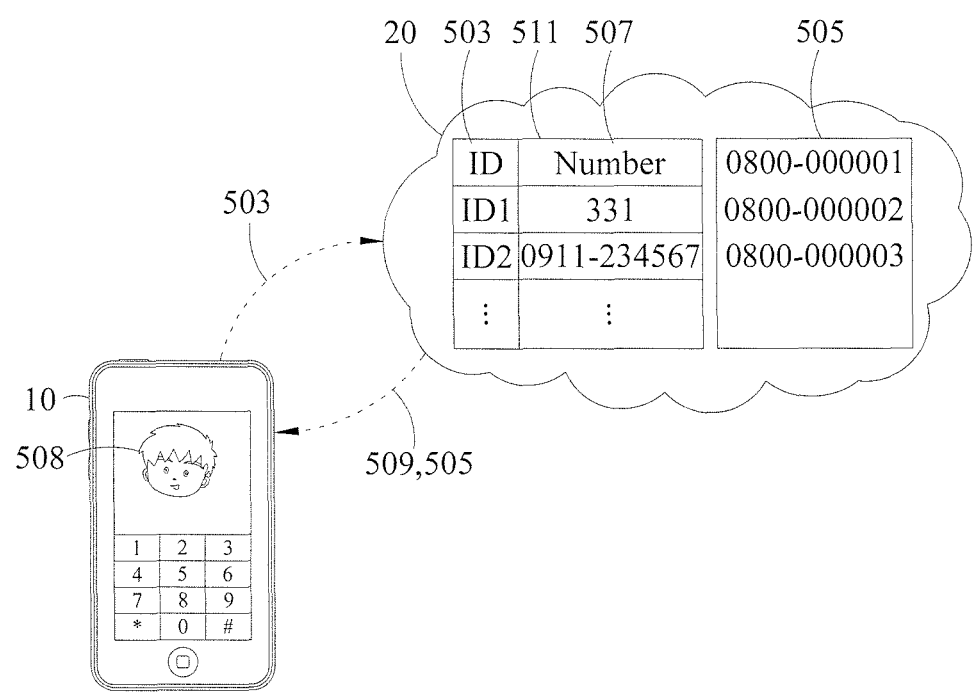
FIG. 1 is a first schematic diagram of an embodiment of a communication establishing method of the present disclosure.
Figure 2:
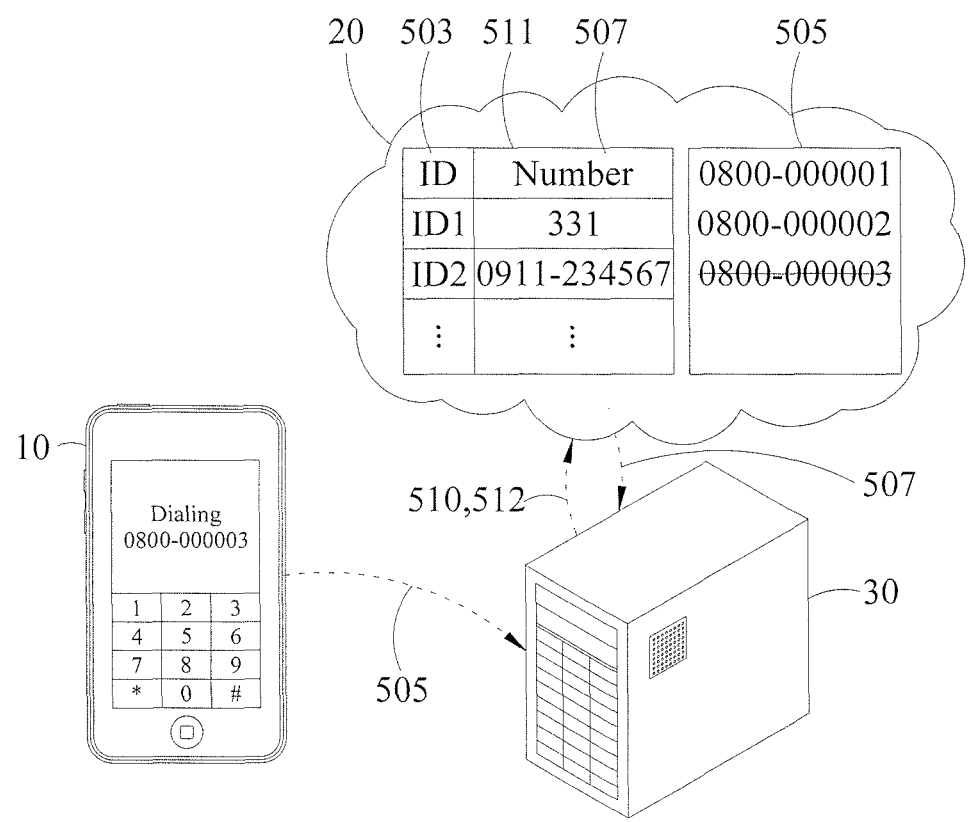
FIG. 2 is a second schematic diagram of the embodiment of the communication establishing method of the present disclosure.
Figure 3:
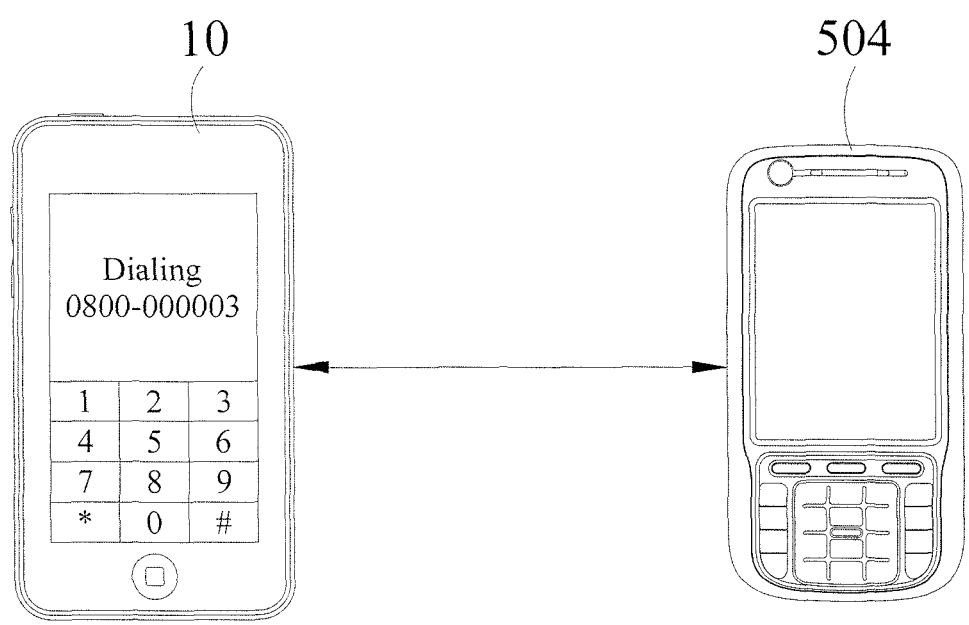
FIG. 3 is a third schematic diagram of the embodiment of the communication establishing method of the present disclosure.

Please refer to FIG. 1, FIG. 2, and FIG. 3 which are first schematic diagram, second schematic diagram and third schematic diagram of an embodiment of the communication establishing method of the present disclosure. As shown in FIG. 1, the user can install a communication service program in a mobile device 10 to communicate with a specific communication terminal 504. The communication service program is stored on the cloud server 20. The mobile device 10 can be a smart phone or a tablet computer, the cloud server 20 can be a workstation, a server or a computer host, and the communication service program can be obtained by detecting a QR-Code on the product via a lens of the mobile device 10. However, the present disclosure is not limited thereto.

In detail, when the lens is utilized to capture the QR-Code containing a network address, the mobile device 10 is automatically connected to a cloud server 20 according to the network address, and the communication service program is then downloaded to the mobile device 10. When being installed in the mobile device 10, the communication service program can be executed by clicking the shortcut pattern 508. The shortcut pattern 508 can display a specific pattern corresponding to a specific communication terminal 504, and the QR-Code can be printed on a business card or a wrapping of a product.

After the communication service program is executed, an identification code 503, such as ID2, corresponding to the communication service program is transmitted to the cloud server 20 via the telecommunication network. The cloud server 20 can obtain the communication number 507 corresponding to the ID2, which is 0911-234567, by searching a lookup table 511 stored in advance. The cloud server 20 can dynamically select a first toll-free number 512 from the plurality of toll-free numbers 505, for example the 0800-000003 is selected, and then the first toll-free number 512 and the communication number 507 are stored. Finally, the cloud server 20 generates a control command 509 and returns the control command 509 to the mobile device 10. The control command 509 is a telephone dialing instruction of dialing 0800-000003 as the first toll-free number 512.

As shown in FIG. 2 and FIG. 3, upon receipt of the control command 509, the mobile device 10 dials 0800-000003 as the first toll-free number 512 to a dial-up device 30 based on the telephone dialing instruction. While dialing, the line of the first toll-free number 512 of 0800-000003 is occupied by the mobile device 10. The dial-up device 30 then transmits a search request 510 containing the first toll-free number 512 to the cloud server 20, and the cloud server 20 finds the corresponding communication number 507 according to the first toll-free number 512, such as 0911-234567, and returns the communication number 507 to the dial-up device 30. The dial-up device 30 automatically transfers to the communication terminal 504 corresponding to the 0911-234567, so as to establish a communication connection between the mobile device 10 and a communication terminal 504.

It is noted that the user's mobile device 10 just displays the dialing information related to dialing of the first toll-free number 512, and the user can not know the real communication number 507 of the communication terminal 504, so that the professional person at the communication terminal 504 can keep the personal privacy.

In detail, different contact approaches can be derived from the communication method for user to contact with the professional person for consultation. For example, multiple contact approaches for the professional person can be stored in the cloud server 20 in advance, such as the home telephone number, office telephone number and cell phone number, and the smart phone of the professional person periodically transmits a positioning signal to the cloud server 20 to provide the location of the professional person. When the dial-up device 30 transmits a search request 510 containing the first toll-free number 512 to the cloud server 20, the cloud server 20 can check the current location of the professional person first, for example, the professional person is at home, so the cloud server 20 can return the home telephone number to the dial-up device 30 for further automatically transferring, whereby the user can dial the home telephone number to contact with the professional person in such communication establishing method, but the user still feels like contacting the professional person via the free-payment call.

By the cloud management method, even though the organization of the company is changed, as long as the contact approach in the lookup table 511 on the cloud server 20 is updated correspondingly, the user still can contact with the correct window inside of the company without changing the address book. Therefore, the personnel cost of telephone transferring can be reduced for the company, even multiple companies can rent a same toll-free number 505 together to save the cost of renting the free-payment telephone number.

In further illustration, the communication establishing method can also be adapted for traditional transferring of the company representative telephone number, and the cloud server 20 just records the identification code 503 and the first toll-free number 512 corresponding to the representative telephone number of the company in advance. After the mobile device 10 downloads the control command 509, the control command 509 is executed to dial the first toll-free number 512 containing the representative telephone number of the company, and the dial-up device 30 automatically transfers the call request to a communication terminal 504 to establish the communication connection between the mobile device 10 and communication terminal 504.

Figure 4:
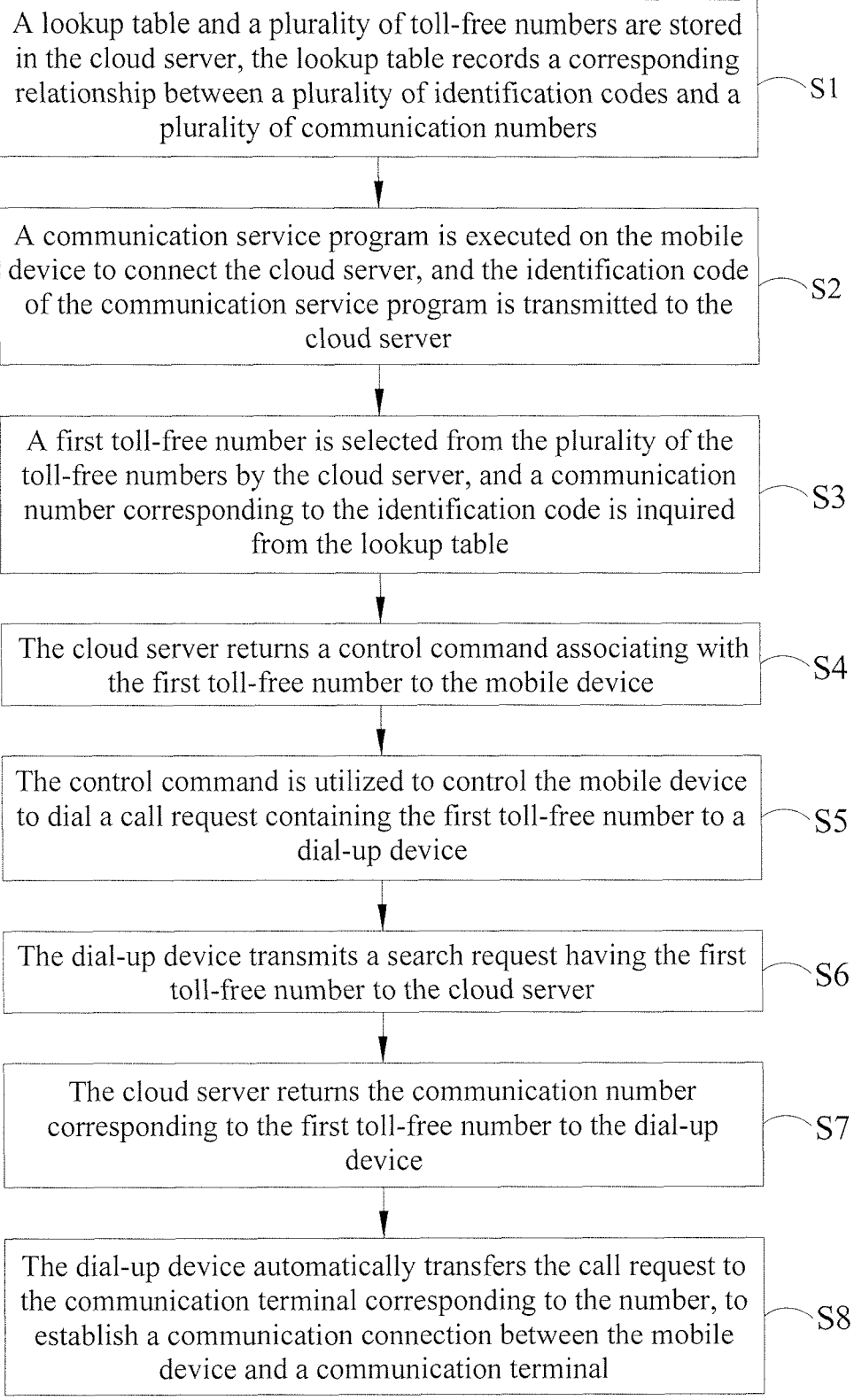
FIG. 4 is a flow diagram of a second embodiment of the communication establishing method according to the present disclosure.

Please refer to FIG. 4 which is a flow diagram of a second embodiment of the communication establishing method of the present disclosure. As shown in FIG. 4, in the step S1 a lookup table and a plurality of toll-free numbers are stored in the cloud server. The lookup table records a corresponding relationship between a plurality of identification codes and a plurality of communication numbers, such as the lookup table 511 shown in FIG. 1. In step S2, a communication service program is executed on the mobile device to connect the cloud server, and the identification code of the communication service program is transmitted to the cloud server. In step S3, a first toll-free number is selected from the plurality of the toll-free numbers by the cloud server, and a communication number corresponding to the identification code is inquired from the lookup table. In step S4, the cloud server returns a control command associating with the first toll-free number to the mobile device. The step S2 to the step S4 can be referred to the example shown in FIG. 1.

In step S5 the control command is utilized to control the mobile device to dial a call request containing the first toll-free number to a dial-up device. In step S6, the dial-up device transmits a search request having the first toll-free number to the cloud server. In step S7, the cloud server returns the communication number corresponding to the first toll-free number to the dial-up device. The step S5 to the step S7 can be referred to the example shown in FIG. 2. In step S8, the dial-up device automatically transfers the call request to the communication terminal corresponding to the number, to establish a communication connection between the mobile device and a communication terminal. The step S8 can be referred to the example shown in FIG. 3.

Figure 5:
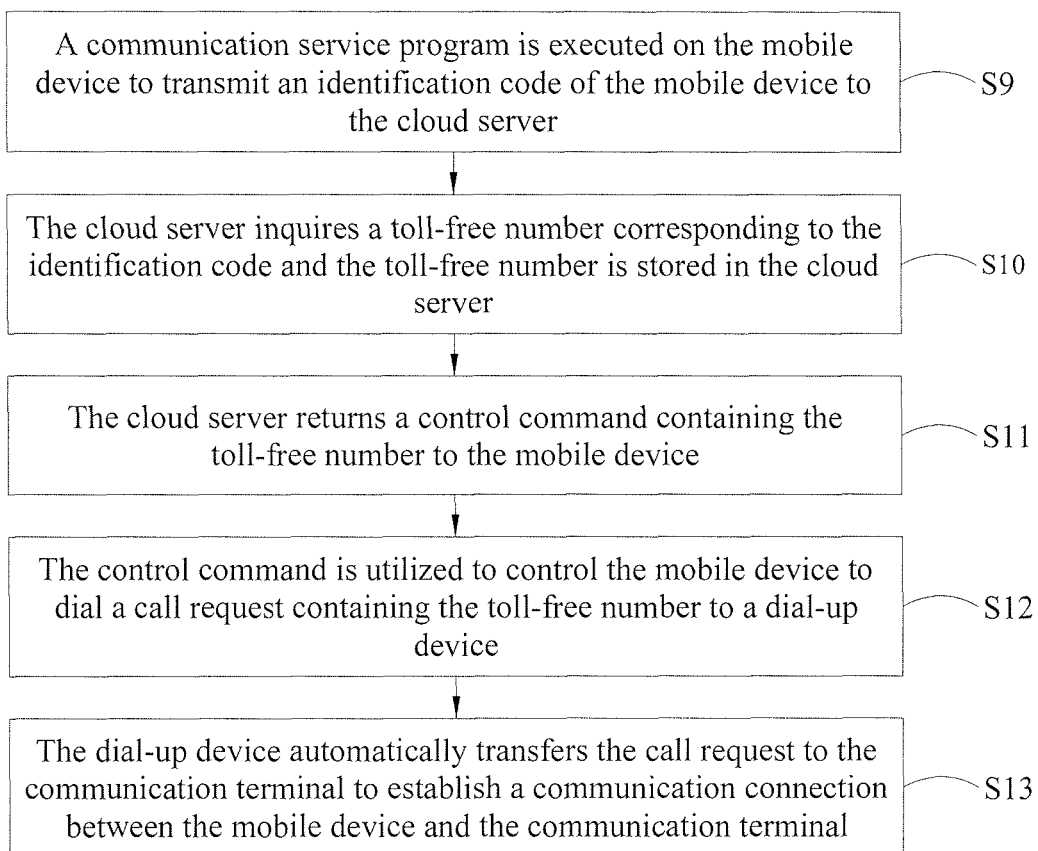
FIG. 5 is a flow diagram of a third embodiment of the communication establishing method according to the present disclosure.

Please refer to FIG. 5 which is a flow diagram of a third embodiment of the communication establishing method of the present disclosure. As shown in FIG. 5, in step S9 a communication service program is executed on the mobile device to transmit an identification code of the mobile device to the cloud server. In the step S10, the cloud server inquires a toll-free number corresponding to the identification code and the toll-free number is stored in the cloud server. In step S11, the cloud server returns a control command containing the toll-free number to the mobile device. In step S12, the control command is utilized to control the mobile device to dial a call request containing the toll-free number to a dial-up device. In step S13, the dial-up device automatically transfers the call request to the communication terminal to establish a communication connection between the mobile device and the communication terminal.

In summary, the present disclosure use a communication service program to enable the user to directly contact the professional person of the company by automatically dialing a toll-free number without remembering the representative telephone number of the company or contact approach of the professional person, whereby the convenience for user can be increased and the professional person does not worry his/her telephone number information is disclosed. Moreover, the technical feature illustrated in the present disclosure is that the communication service program can be incorporated with the GPS system of the mobile device of the professional person, to provide at least one contact approach to allow the user to contact with the professional person directly, and the cost of renting dedicated phone line of the representative telephone number and personnel management cost can be reduced efficiently.

While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. A communication establishing method, comprising:
   storing a lookup table and a plurality of toll-free numbers on a cloud server, and a corresponding relationship between a plurality of identification codes and a plurality of communication numbers being recorded in the lookup table;
   executing a communication service program on a mobile device to connect the cloud server, and transmitting an identification code of the communication service program to the cloud server;
   determining a first toll-free number from the plurality of toll-free numbers by the cloud server, and inquiring a communication number corresponding to the identification code from the lookup table;
   transmitting a control command containing the first toll-free number to the mobile device by the cloud server;
   dialing a call request containing the first toll-free number from the mobile device to a dial-up device by utilizing the control command;

transmitting a query request having the first toll-free number to the cloud server by the dial-up device;

returning the communication number corresponding to the first toll-free number to the dial-up device by the cloud server; and transferring the call request automatically to a communication terminal corresponding to the communication number by the dial-up device, and establishing a communication connection between the mobile device and the communication terminal.

2. The communication establishing method of claim 1, further comprising:

detecting a recognition unit by the mobile device to obtain a network address, and connecting to the cloud server according to the network address for downloading the communication service program to the mobile device;

generating a shortcut pattern on a screen of the mobile device by the communication service program after the communication service program being installed in the mobile device; and executing the communication service program by clicking the shortcut pattern;

wherein the shortcut pattern displays a pattern corresponding to the communication terminal.

3. The communication establishing method of claim 2, wherein the network address is obtained by using an image capture module of the mobile device to capture and analyze an image of the recognition unit, or by using a sensing unit of the mobile device to sense the recognition unit, wherein the recognition unit comprises characters, image, barcode, QR code printed or bound on an object, or a NFC sensing IC or RFID IC disposed inside the object.

4. The communication establishing method of claim 1, wherein the first toll-free number is dynamically selected from the plurality of toll-free numbers stored in the cloud server.

5. The communication establishing method of claim 1, wherein the control command comprises a telephone dialing instruction and the mobile device displays the first toll-free number while dialing.

6. A communication establishing method, comprising:

executing a communication service program on a mobile device to transmit an identification code of the communication service program to a cloud server;

inquiring a toll-free number corresponding to the identification code by the cloud server and the toll-free number being stored in the cloud server;

transmitting a control command containing the toll-free number to the mobile device by the cloud server;

dialing a call request containing the toll-free number from the mobile device to a dial-up device by utilizing the control command; and transferring the call request automatically to the communication terminal by the dial-up device, and establishing a communication connection between the mobile device and the communication terminal.

7. The communication establishing method of claim 6, further comprising:

detecting a recognition unit by the mobile device to obtain a network address, and connecting to the cloud server according to the network address for downloading a communication service program to the mobile device;

generating a shortcut pattern on a screen of the mobile device by the communication service program after the communication service program being installed in the mobile device; and executing the communication service program by clicking the shortcut pattern;

wherein the shortcut pattern displays a pattern corresponding to the communication terminal.

8. The communication establishing method of claim 7, wherein the network address is obtained by using an image capture module of the mobile device to capture and analyze an image of the recognition unit, or by using a sensing unit of the mobile device to sense the recognition unit.

9. The communication establishing method of claim 8, wherein the recognition unit comprises characters, image, barcode, QR code printed or bound on an object, or a NFC sensing IC or RFID IC disposed inside the object.

10. The communication establishing method of claim 6, wherein the control command comprises a telephone dialing instruction and the mobile device displays the toll-free number while dialing.

\* \* \* \* \*